United States Patent [19]
Ford et al.

[11] Patent Number: 5,277,851
[45] Date of Patent: Jan. 11, 1994

[54] PROCESS OF MAKING A POROUS HOLLOW FIBER MEMBRANE

[76] Inventors: Douglas L. Ford, 64 Fingal Avenue, Glenhaven, New South Wales; Clinton V. Kopp, 53 Tuckwell Road, Castle Hills, New South Wales; Robert J. W. Streeton, 33 Drummond Street, Windsor, New South Wales, all of Australia

[21] Appl. No.: 941,376

[22] Filed: Sep. 4, 1992

Related U.S. Application Data

[63] Continuation of Ser. No. 536,649, Jul. 9, 1990, abandoned.

[30] Foreign Application Priority Data

Nov. 10, 1988 [AU] Australia .............................. PJ1395

[51] Int. Cl.$^5$ ............................................. D01D 5/247
[52] U.S. Cl. .................................... 264/41; 264/209.1; 264/211; 264/211.15; 264/211.16; 264/558; 264/561; 264/562
[58] Field of Search ............... 264/41, 49, 209.1, 211, 264/211.15, 211.16, 558, 561, 562

[56] References Cited

FOREIGN PATENT DOCUMENTS 180052  5/1986  European Pat. Off. .

*Primary Examiner*—Leo B. Tentoni
*Attorney, Agent, or Firm*—Waldron & Associates

[57] ABSTRACT

A method of making a porous polymeric material by heating a mixture of a thermoplastic polymer and a cationic or non-ionic surfactant having a hydrophilic-lipophilic balance range of 4.0 to 6.0 to a temperature and for a time sufficient for the polymer and surfactant to mutually dissolve. The mixture is then cooled to a temperature so that non-equilibrium liquid-liquid phase separation takes place to form a bi-continuous matrix of the polymer and surfactant so that the polymer and surfactant form two intermingled separate phases of large interfacial surface area. The surfactant is then removed from the polymer. The porous polymeric material produced by the above method has a lacey or filamentous structure consisting of a plurality of polymer strands connected together at spaced apart locations along each strand.

12 Claims, 2 Drawing Sheets

PROCESS OF MAKING A POROUS HOLLOW FIBER MEMBRANE

This is a continuation of application Ser. No. 07/536,649, filed Jul. 9, 1990, now abandoned.

FIELD OF INVENTION

This invention relates to porous polymeric structures and to a process for the manufacture of such porous structures.

BACKGROUND ART

Porous polymeric structures having pores in the range of 0.01 to 10 microns are commonly used for microfiltration. Such membrane structures may be prepared from thermoplastic polymers using precipitation techniques and formed into various shapes including hollow fibres or flat sheets.

The thermal precipitation technique for membrane formation commences with the formation of a solution of a thermoplastic polymer in a solvent at an elevated temperature. The solution is then cooled and, at a specific temperature which depends on the polymer, the solvent, the concentration of the polymer in the-solvent and the rate of cooling, phase separation occurs and the liquid polymer separates from the solvent.

All practical precipitation methods follow the same general process which is reviewed by Smolders et al in Kolloid Z.u.Z. Polymere 43, 14–20 (1971). The article distinguishes between spinodal and binodal decomposition of a polymer solution.

When the solution of a polymer in a solvent is allowed to cool at an infinitely slow rate, a temperature is reached, below which phase separation occurs and the liquid polymer separates from the solvent. This is called binodal decomposition of the polymer solution.

When the rate of cooling is finite, the temperature at which phase separation occurs is generally lower than in the case of binodal decomposition. This is called spinodal decomposition of the polymer solution.

For practical purposes, all precipitation processes must be reasonably fast and so fall into the category of spinodal decomposition.

In most processes, the relative polymer and solvent concentrations are such that phase separation results in fine droplets of solvent forming in a continuous polymer phase. These fine droplets form the pores of the membrane. As cooling continues, the polymer freezes around the solvent droplets. When phase separation occurs there is still some solubility of the polymer in the solvent and solvent in the polymer.

As the temperature is lowered, these solubilities decrease, and more and more solvent droplets appear in the polymer matrix. Crystallization of the droplets within the polymer results in shrinkage and cracking, thus forming interconnections between the pores. Finally, the solvent is removed from the pores.

Known precipitation methods of porous membrane formation depend on the liquid polymer separating from the solvent followed by cooling so that the solidified polymer can then be separated from the solvent. Whether the solvent is liquid or solid when it is removed from the polymer depends on the temperature at which the operation is conducted and the melting point of the solvent.

True solutions require that there be a solvent and a solute. The solvent constitutes a continuous phase, and the solute is distributed randomly in the solvent at a molecular level. Such a situation is almost unknown with polymer solutions. Long polymer chains tend to bend back on themselves and form temporary interactions or bonds with other polymer chains with which they come into contact. These interactions are continually forming and breaking, and new ones are formed. Polymer solutions are thus rarely true solutions but lie somewhere between true solutions and mixtures.

In many cases it is also difficult to state which is the solvent and which is the solute. In the art, it is accepted practice to call a mixture of polymer and solvent a solution if it is optically clear without obvious inclusions of either phase in the other. Phase separation is usually then taken to be that point where there is an optically detectable separation.

There is yet another case where the heated mixture of polymer, solvent, and other components if present, is neither a solution nor a mixture in the usual sense of the words. This is the case where a surface-active agent is present in sufficient concentration to form ordered structures such as micelles.

In U.S. Pat. No. 3,378,508, a polymer is heated with a solvent that is an anionic surfactant. The solution is then cooled and membrane formation results which is in accordance with the teachings of the spinodal decomposition technique. As the anionic surfactant solvent is a solid at room temperature, solvent removal is by removal of the solid surfactant from the pores.

U.S. Pat. No. 4,247,498 describes the use of the spinodal decomposition technique with slow cooling of the solution in relation to a wide range of polymers and solvents. According to U.S. Pat. No. 4,247,498, the slow cooling of the solution-allows the solvent droplets to coalesce somewhat before the polymer freezes around them. As the solution is cooled, more and more solvent droplets are formed. Their rate of coalescence is governed by the rate of diffusion of solvent through the liquid polymer matrix. A longer time at a higher temperature allows a greater diffusion of the solvent. The slow cooling also affects the rate at which crystal nuclei form in the polymer. The result is a membrane containing large cells interconnected by fine channels. The porous material of U.S. Pat. No. 4,247,498 is extruded into air to form a block having a skin over its surface.

U.S. Pat. No. 4,564,448 discloses a porous surface achieved by the technique of extruding the polymer solution into a bath of the solvent used forming the solution with the temperature of the bath being above the temperature where phase separation occurs.

U.K. Specification 2,115,425 discloses a spinodal decomposition technique with the modification that the solvent for the polymer is a mix of solvents, one of which is a very good solvent for the polymer and the other is a poor solvent. The ratio of the two solvents is adjusted to obtain a composite solvent that has the desired temperature related solvency effect for the polymer. Variation in the ratio of the two solvents affects the structure of the resultant membrane.

The process disclosed in abovementioned U.S. Pat. No. 3,378,508 consists of heating a mixture of a solid thermoplastic polymer of mono-ethylenically unsaturated hydrocarbons, and, a water-soluble anionic surfactant to a temperature where the polymer and surfactant are mutually soluble, cooling the mixture to a temperature where the polymer and surfactant form two intermingled separate phases, and, dissolving the surfactant phase from the polymer.

According to U.S. Pat. No. 3,378,508, the hydrocarbon and surfactant are mixed at elevated temperatures at which the two materials are mutually soluble to obtain a completely uniform distribution of the surfactant in the polymer. The specification discloses that any water soluble anionic surfactants and solid, thermoplastic polymers of mono-ethylenically unsaturated hydrocarbons form a homogeneous mixture at a temperature determined by the higher of either the melting point of the surfactant or the softening temperature of the polymer.

U.S. Pat. No. 3,378,507 details attempts made to incorporate into polyethylene non-ionic and cationic surfactants such as nonylphenoxypoly(oxyethylene) ethanol, polyoxyethylated fatty alcohols, polyoxyethylated fatty acids, polyoxyethylated vegetable oil, copolymers of polyoxyethylene and polyoxypropylene, polyethylene glycol ethers and mixed alkyl amine salts containing an average of 18 carbon atoms in the aklyl group.

The non-ionic surfactants were found to be incompatible with polyethylene and would not mix with polyethylene. Although the Cationic surfactants could be milled into the polyethylene, the cationic surfactant could not then be washed out by water, ethanol or other solvents.

Contrary to the teachings of U.S. Pat. No. 3,378,507, we have found that certain cationic and non-ionic surfactants can be used to form porous materials. For example, whereas the U.S. specification states that nonylphenoxypoly(oxyethylene) ethanol cannot be used, we have found that at least some of that class of surfactant can be used.

An influencing factor is the polarity of the cationic or non-ionic surfactant which can be described in relation to the hydrophilic-lipophilic balance of the surfactant. Within a certain hydrophilic-lipophilic balance range we have found that there is no restriction on the type of surfactant than can be used to form porous membranes from a polymeric solution.

DISCLOSURE OF THE INVENTION

According to the invention there is provided a method of making a porous polymeric material comprising the steps of
a) heating a mixture comprising:
  (i) a thermoplastic polymer and,
  (ii) cationic or non-ionic surfactant having a hydrophilic-lipophilic balance range of 4.0 to 6.0 to a temperature and for a time sufficient for polymer and surfactant to mutually dissolve,
b) cooling the mixture to a temperature so that non-equilibrium liquid-liquid phase separation takes place to form a bi-continuous matrix of the polymer and surfactant in which the polymer and surfactant form two intermingled separate phases of large interfacial surface area and,
c) removing the surfactant phase from the polymer.

The hydrophilic-lipophilic balance values mentioned above are relatively low for surfactants—in other words, the surfactants which are suitable are relatively hydrophobic (i.e., lipophilic). Surfactants with hydrophilic-lipophilic balance values lower than the preferred range have too good a solvency for the membrane to form when the dope is quenched, and surfactants with higher hydrophilic-lipophilic balance values will not dissolve the polymer.

Nonylphenoxypolyethylene glycols (which are also called nonylphenoxypoly(oxyethylene) ethanols) are represented by the graphical formula

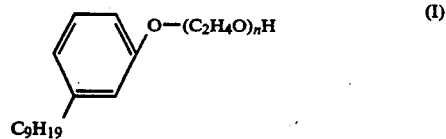

The second member of the series, where $n=2$, nonyphenoxyethoxyethanol is a preferred surfactant of the present invention and is the most prevalent member of the series in a mixture of nonylphenoxypolyethylene glycols that make up a commercially available solvent TERIC N2 (TERIC is a Registered Trade Mark). Nonylphenoxyethoxyethanol is represented by the graphical formula:

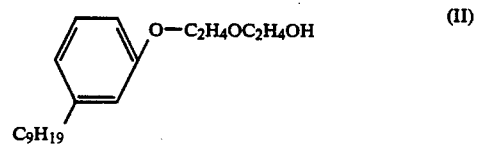

Solvents in this series represent a distribution of nonylphenoxypolyethylene glycols. The nonylphenoxypolyethylene glycols are initially a mixture represented by a Poissonian distribution, however, the exact distribution of the final product depends on further processing such as distillation of low boiling point components to give the material as provided by the supplier.

The second member of the series can be used in the process of the invention to provide a porous structure but as n increases above 2 the material becomes more and more polar and will not produce porous structures when used in the process of the invention. In the case of TERIC N2, the preferred range of the hydrophilic-lipophilic balance is 5.6 to 5.8.

Another solvent which may be used is SYNPROLAM 35X2 which is an amine ethoxylate of the general formula:

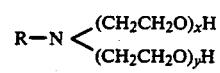

where $x+y$ 2 to 50 and R is a mixture of $C_{13}$ and $C_{15}$ fatty radicals in the approximate ratio of 70:30 about half of which are linear and the rest mostly branched species. In the case of SYNPROLAM 35X2, $x+y=2$. Yet another solvent which may be used is BRLJ 92 which is a polyoxyethylene (2) oleyl alcohol. SYNPROLAM and BRIJ are Registered Trade Marks.

Other solvents having a hydrophilic-lipophilic balance in the range of 4.0 to 6.0 which may be used in carrying out the process of the invention include:
(a) ethyloxylated derivatives of cetyl-oleyl alcohol such as TERIC 17A2
(b) condensates of ethylene oxide with tall oil such as TERIC T2
(c) self-emulsifying derivatives from high molecular weight fatty acids such as TERIC 124
(d) sorbitan monooleate
(e) sorbitan monostearate
(f) sorbitan sesquioleate (g) POE hexitan fatty acid ester
(h) POE cetyl oleyl alcohol such as ATLAS G-70140
(i) ATMER 685 nonionic surfactant
(j) POE (2) cetyl alcohol
(k) POE (2) stearyl alcohol
(l) POE fatty alcohols such as CIRRASOL EN-MB and CIRRASOL EN-MP
(m) POE (2) synthetic primary $C_{13}/C_{15}$ alcohol such as RENEX 702

ATLAS, ATMER, CIRRASOL and RENEX are Registered Trade Marks.

Although the preferred thermoplastic polymer is polypropylene, the following polymers may be used:
(a) polybutylene
(b) polyvinylidene difluoride
(c) polyvinylidene dichloride
(d) polyamide
(e) polyvinyl chloride
(f) polystyrene
(g) polymethylmethacrylate
(h) polyphenylene oxide
(i) polyethylene terephthalate
(j) polyacrylonitrile
(k) cellulose acetate In a preferred form of the invention, the porous polymeric material is formed as a hollow fibre using a quadruple co-extrusion head having four concentric passageways. The axial passageway receives a lumen forming fluid, the next outward passageway contains a homogenous mixture of the polymer and a surfactant solvent to form the membrane, the next outwardly concentric passageway has a coating fluid and the outermost passageway has a cold quench fluid. The lumen, coating and quenching fluids do not contain the surfactant.

Each fluid is transported to the extrusion head by means of individual metering pumps. The four components are individually heated and are transported along thermally insulated and heat traced pipes. The extrusion head has a number of temperature zones. The lumen fluid, membrane dope and coating fluid are brought to the same temperature in a closely monitored temperature zone where the polymer solution making up the dope is shaped. The quench fluid is introduced in a cooling zone where the dope undergoes non-equilibrium liquid-liquid phase separation to form a bicontinuous matrix of large interfacial surface area of two liquids in which the polymer phase is solidified before aggregated separation into distinct phases of small interfacial surface area can take place.

The hollow fibre membrane leaves the extrusion head completely formed and there is no need for any further formation treatment except for removing the surfactant solvent from the membrane in a post-extrusion operation that is common to membrane manufacturing processes. A volatile solvent that does not dissolve the polymer is used to remove the surfactant solvent for the polymer from the finished membrane.

It is preferred that the formed fiber shape is drawn through the quench tube at a rate such that the diameter of the hollow fiber form is reduced in diameter after it leaves the extrusion head. We prefer that the final diameter of the fiber is in the range of from about 0.25:1 to about 0.10:1.

The lumen forming fluid may be selected from a wide variety of substances such as soybean ail and an inert gas such as nitrogen. The same substance may be used as the coating and quenching fluids. Water may be used as the quenched fluid. Other substances which may be used as the lumen forming material, the coating fluid and the quenching fluid include:
(a) paraffin oil
(b) peanut oil
(c) teel oil
(d) boleko oil
(e) oil of mustard
(f) olive oil
(g) seneca oil
(h) coconut oil
(i) coffee oil
(j) rapeseed oil
(k) corn oil
(l) cottonseed oil
(m) glycerol
(n) glyceryl trioleate
(o) trimyristin
(p) jojoba oil
(q) macassar oil
(r) neem oil
(s) castor oil
(t) arris root oil
(u) safflower oil
(v) oleic, palmitic, stearic, arachidic, arachidanic, behenic, lignoceric, linoleic, linolenic, elaidic, vaccenic acids and their glycerides, and mixed with their sodium, potassium and calcium salts
(w) dioctylphthalateand other phthalate esters of alcohols of six carbon atoms or more.

The homogenous mixture of the thermoplastic polymer and surfactant solvent (i.e. dope) may include an anti-oxidant. In the case of polypropylene, the preferred anti-oxidant is ETHANOX 330 (ETHANOX is a Registered Trade Mark) which has the chemical name 1,3,5,-trimethyl-2,4,6-tris-3,5-di-tert-butyl-4-hydroxybenzyl)benzene. Any hindered phenol which dissolves in the dope could be used.

It has been found that in the case of the polypropylene/TERIC N2 system, the concentration of the polymer in the dope may be from 15% to 50% weight by weight although the preferred range is 20% to 40% weight by weight.

Solvent viscosity may be in the range of 10 to 1,000 mPa.s and the quench liquid viscosity may be from 20 to 100 mPa.s although 50 to 70 mpa.s is preferred. Using the extrusion apparatus described above, the hollow fibre may be extruded at a rate of 40 to 120 meter/minute although the preferred range is 50 to 85 meter/minute.

The hollow fibre membrane of the invention is characterised by a lacey or filamentous structure. In this specification, the term "lacey" means that the membrane is made up of a plurality of polymer strands connected together at a number of locations along each strand. Each connection point has only slightly larger dimensions than the cross-section of the strands. The length of each strand is from 5 to 50 times the diameter of the strand and the strands vary in cross-sectional shape from circular to elliptical, in the latter case the major axis of the ellipse may be up to 5 times the minor axis of the ellipse. The description "lacey or filamentous structure" may also be visualised as a three dimensional rounded lace filet derived from a bicontinuous structure.

In a preferred form of the invention, the hollow fibre membrane has a lacey structure in which there is some slight orientation of the strands in the axial direction of the fibre so that when a lumenal gaseous blowback procedure is implemented to clean the fibres, certain dimensions of the interstices increase on average allowing any material ledged in the interstices to be easily dislodged. The interstices are of a generally axially elongated shape and when the gaseous blowback is applied, the interstices distort from the axially elongated shape into a generally square shape to enlarge the minimum dimension of the interstices. The gaseous blowback will also stretch the fibre to increase the minimum dimension of the interstices.

BRIEF DESCRIPTION OF THE DRAWINGS

In order that the invention may be mare readily understood and put into practical effect, reference will now be made to the accompanying drawings in which:

FIG. 1 is a temperature-composition phase diagram for a generalised polymer/solvent system showing liquid-liquid and solid-liquid phase separation. The abscissa represents composition of the mixture ranging from no polymer at the left to all polymer at the right. The ordinate represents temperature. To the right of the diagram, line 10 which slopes upwards at a straight oblique angle represents division between complete solution above the line and solid-liquid separation below the line. The region above line 10. extends to the left of the diagram over the top of upwardly convex line or curve 11 so that all of the top of the diagram above lines 10 and 11 represents conditions that result in complete solution of the polymer in the solvent.

Under curve 11 is an upwardly convex dashed line 12 that represents the division between liquid-liquid non-equilibrium phase separation above line 12 and liquid-liquid equilibrium phase separation below line 12. Line 12 is shown dashed because the actual location of the line is indistinct.

The region between the dashed lines 12 and the solid line 11 is a metastable region above which the components must form one phase and below which the components must form distinct liquid phases. The region between the horizontal dash-dot line 13 and solid line 11 is the miscability gap. The solid line 11 represents phase separation when the temperature is lowered infinitely slowly, and the dashed line 12 represents phase separation when the temperature is lowered infinitely rapidly. Because the manufacturing process of the invention is a non-equilibrium process, it passes from a point above the miscibility gap through the binodal curve (solid line 11) into the metastable region in the vertical direction, and somewhere in that region the liquid-liquid bicontinuous matrix forms, and continuing vertically down through the spinodal curve (dashed line 12) into the liquid-liquid region, and further down past the dash-dot line 13 where the polymer rich phase solidifies, to a point somewhere in the solid-liquid region.

The position along the horizontal axis where the quench is performed determines what structure is obtained. A granular structure generally occurs from positions to the left of the apex of the bimodal and spinodal curves. A granular structure is in our view of little commercial value for microporous membranes using gaseous backwash. Our process uses conditions to the right of the apex of the binodal and spinodal curves which result in a lacey structure. In our view any membrane produced by thermal precipitation that has a lacey structure must have been made by spinodal decomposition.

Figure 1:
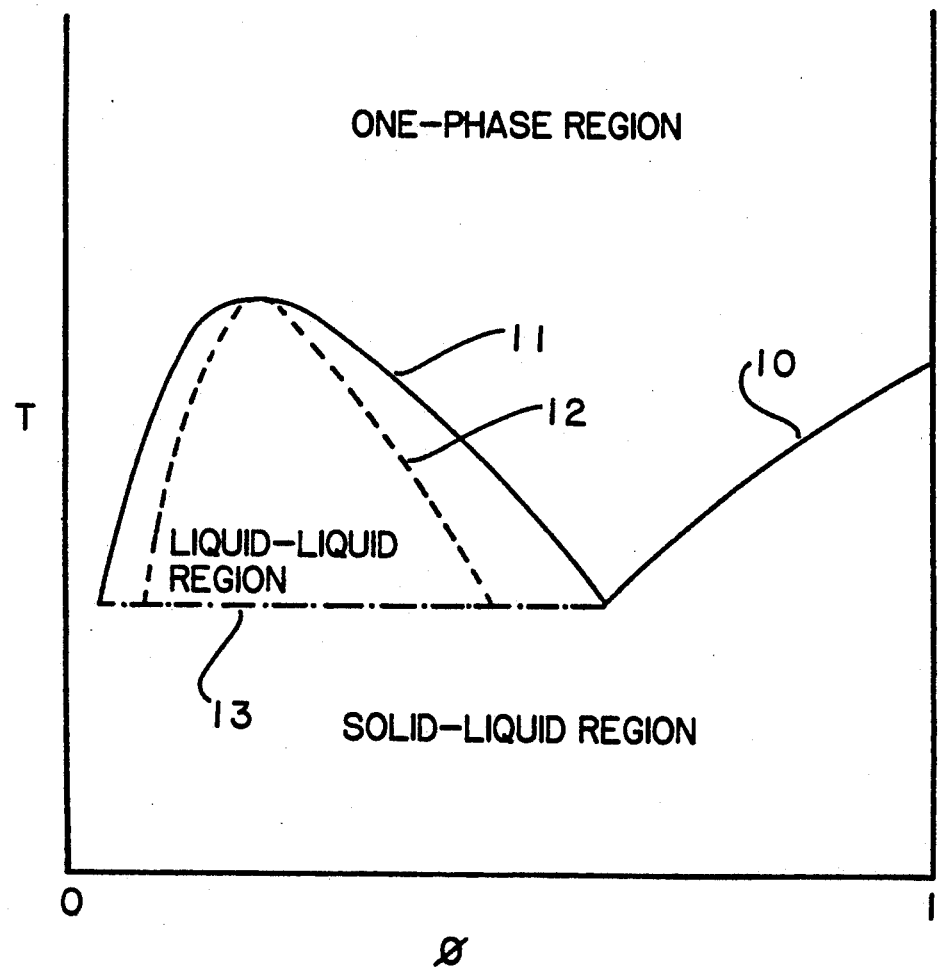
FIG. 1 is a phase diagram for a generalised polymer/solvent system.
Figure 2:
FIG. 2 is a schematic micrographic representation of the structure of the porous polymeric material according to one embodiment of the present invention.

FIG. 2 schematically represents a three-dimensional photomicrograph taken of a preferred porous polymeric material prepared according to the method of the present invention. The darkened regions 14 represent solid polymeric material at the surface of the image. The lined regions 15 represent solid polymeric material slightly below the surface of the image. The dotted regions 16 represent polymer bridges well below the surface of the image. The blank regions represent the alveolar structure.

DESCRIPTION OF THE PREFERRED EMBODIMENTS

The invention will now be described with reference to the production of porous hollow fibre membranes.

EXAMPLE 1

A dope was formed by mixing and then heating 2,600 gram of polypropylene pellets, 7,300 gram of TERIC N2 and 100 gram of anti-oxidant ETHANOX 330. The temperature of the dope was raised to above 220° with agitation under vacuum to ensure that that the mixture became homogeneous. The dope was then extruded through the quadruple passage die at a temperature of 220° C.

Nitrogen was used as the lumen forming fluid and soybean oil as the coating fluid and quenching fluid. The dope flow rate was 22cc/min, the lumen pump flow rate 7.6 cc/min, the coating pump flow rate 5.0 cc/min and the quench pump flow rate was 1,750 cc/min.

The circularity of the fibre prior to extraction of the solvent was 95% and the break extension was 175%. After extracting the solvent, the physical characteristics of the fibre were:

| | |
|---|---|
| Lumen | 340 micron |
| Outer diameter | 640 micron |
| Circularity | |
| Concentricity | |
| Bubble Point | >170 kpa |
| % pores above 0.16 micron | >50% |
| Mean pore size | 0.20 micron |
| Water Permeability at 50 kPa | >40 cc/min/m |
| Yield force | 0.8 N |
| Break force | 1.0 N |
| Break extension | >150% |
| Surface pore width (nominal) | 1 micron |

The structure of the fibre so formed was generally lacey.

The lacey structure does not lend itself to a precise qualitative description in terms used to describe prior art membranes such as cells and pores. In the prior art such as U.S. Pat. No. 4,519,909, cells relate to spheres and pores relate to cylinders. In some respects, the parts of the lacey structure where one cavity intersects another may be equivalent to a "cell" and the actual intersection itself a "pore". Topologically, such "cells" of the lacey structure relate to adjacent spheres and such "pores" relate to circles formed by their intersection whereas in the prior art the cells relate to separated spheres and the pores relate to the connecting cylinders.

As well as such "pores" anil "cells", the lacey structure has alveoli which are larger cavities than cells and these connect to a larger number of "cells". The lacey structure occupies the spaces between the alveoli.

A typical lacey structure may have substantially spherical "cells" of between 0.1 to 5 micron which have substantially circular "pores" of 0.1 to 0.5 micron interconnecting the cells to each other. The "pores" also connect the cells to alveoli of about 8 to 20 micron.

Water Permeability tests showed that the permeability of a typical fibre from outside to lumen was one third of the permeability from lumen to outside.

Although the invention has been described in relation to a polypropylene/TERIC N2 solution, it is to be understood that the invention is not limited thereto. Soybean oil with or without castor oil may be added to the solution as co-solvent and SYNPROLAM 35X2 or BRIJ 92 may be used instead of TERIC N2. A solvent may be added to the coating fluid.

Surface pore modification may be effected by both temperature control and variation of the composition of the coating fluid. Membranes can be prepared having elongated pores in the axial direction but with symmetrical morphology in the radial and circumferential directions. Surface porosity can be varied in radial porosity from a "skin" through to complete radial isotropy and further to having a surface that is more porous than the remainder of the membrane (reverse asymmetry).

During extrusion, the coating fluid mixes significantly with the molten polymer solution to a greater extent than the quench fluid mixes when the coating fluid is omitted. The coating fluid controls the surface porosity of the membrane. The hot coating fluid ameliorates the sudden cooling effect of the quench fluid on the dope. The coating fluid is a separate, co-extrusion, and is neither part of the membrane extrusion nor the quench co-extrusion.

Although the precise mechanism of the structure formation is not clear, it would seem that a liquid-liquid bicontinuous system is formed which if maintained for sufficient time would become two separate layers. During this process, the system could be made to pass through a lacey structure followed by a stage of nearly spherical cells with interconnecting pores. For a given polymer and solvent mix, the size range of the cells depends on cooling rate and the interfacial surface tension between the polymer rich and the polymer lean phases while the pore size depends on cooling rate and, to a lesser extent, molecular weight of the polymer.

It is to be noted that the fibre travels down the quench tube at a significantly different linear speed from the quench fluid. The extruded fibre travels at a speed three to four times faster than the average speed of the quench fluid. Such a speed difference calculated on the average speed also means that the fibre travels at a speed about double the maximum speed of the quench fluid. The average and maximum speed of the quench fluid above are taken as the speed with no fibre present.

Although the above example refers to the use of nitrogen as the lumen forming fluid, any saturated vapour may be used as may a wide variety of liquids. When nitrogen (or a saturated vapour) is used, it has the effect of reducing the lumenal surface pore size, giving greater asymmetry. Use of a saturated vapour has the property that it will condense in the lumen under cooling, allowing the quench fluid to pass through the porous walls, and give some measure of mechanical compression to the solidifying membrane.

EXAMPLE 2

5.2 kg Hoechst polypropylene PPN1060F was dissolved in 14.6 kg TERIC N2 with 0.2 kg antioxidant Ethanox 330 and extruded at a temperature of 230° C. with soybean oil as the lumen, coating and quench fluids. The quench fluid temperature was 31.3° C.

The dimensions of the fibre were 322 micron lumen diameter and 671 micron outside diameter.

The resulting fibre had a water permeability of 106 ml/min/m at 96 kPa, 367 ml/min/m at 398 kPa, and 478 ml/min/m at 599 kPa, a mean pore size of 0.301 micron and 90.7% pores above 0.16 micron.

EXAMPLE 3

5.2 kg Hoechst polypropylene PPN1060F was dissolved in 14.6 kg TERIC N2 with 0.2 kg antioxidant Ethanox 330 and extruded at a temperature of 230° C. with soybean oil as the lumen, coating and quench fluids. The quench fluid temperature was 29.9° C.

The dimensions of the fibre were 324 micron lumen diameter and 652 micron outside diameter.

The resulting fibre had a water permeability of 126 ml/min/m at 96 kPa, 430 ml/min/m at 398 kPa, and 543 ml/min/m at 599 kPa, a mean pore size of 0.380 micron and 95.2% pores above 0.16 micron.

EXAMPLE 4

5.2 kg Hoechst polypropylene PPN1060F was dissolved in 14.6kg TERIC N2 with 0.2 kg antioxidant Ethanox 330 and extruded at a temperature of 230° C. with soybean oil as the lumen, coating and quench fluids. The quench fluid temperature was 31.7° C.

The dimensions of the fibre were 323 micron lumen diameter and 640 micron outside diameter.

The resulting fibre had a water permeability of 94 ml/min/m at 95 kPa, 330 mi/min/m at 396 kpa, and 448 ml/min/m at 598 kPa, a mean pore size of 0.310 micron and 87.9% pores above 0.16 micron.

EXAMPLE 5

5.2 kg Hoechst polypropylene PPN1060F was dissolved in 14.6 kg TERIC N2 with 0.2 kg antioxidant Ethanox 330 and Extruded at a temperature of 230° C. with soybean oil as the lumen, coating and quench fluids. The-quench fluid temperature was 31.8° C.

The dimensions of the fibre were 320 micron lumen diameter and 627 micron outside diameter.

The resulting fibre has a water permeability of 80 ml/min/m at 98 kPa, 288 ml/min/m at 399 kPa, and 393 ml/min/m at 600 kPa, a mean pore size of 0.260 micron and 80.9% pores above 0.16 micron.

EXAMPLE 6

5.2 kg Hoechst polypropylene PPN1060F was dissolved in 14.6 kg TERIC N2 with 0.2 kg antioxidant Ethanox 330 and extruded at a temperature of 230° C. with soybean oil as the lumen, coating and quench fluids. The quench fluid temperature was 30.5° C.

The dimensions of the fibre were 325 micron lumen diameter and 642 micron outside diameter.

The resulting fibre had a water permeability of 73 ml/min/m at 98 kPa, 288 ml/min/m at 399 kPa, and 393 ml/min/m at 600 kPa, a mean pore size of 0.260 micron and 80.9% pores above 0.16 micron.

EXAMPLE 7

6.75 kg Hoechst polypropylene PPN1060F was dissolved in 18.25 kg TERIC N2 with 0.25 kg antioxidant Ethanox 330 and extruded at a temperature of 230° C. with soybean oil as the lumen, coating and quench fluids. The quench fluid temperature was 30.1° C.

The nominal dimensions of the fibre were 320 micron lumen diameter and 650 micron outside diameter.

The resulting fibre had a water permeability of 68 ml/min/m at 95 kPa, 288 ml/min/m at 402 kPa, and 347 ml/min/m at 600 kPa, a mean pore size of 0.270 micron and 80.1% pores above 0.16 micron.

EXAMPLE 8

5.2 kg Hoechst polypropylene PPN1060F was dissolved in 14.6 kg TERIC N2 with 0.2 kg antioxidant Ethanox 330 and extruded at a temperature of 230° C. with soybean oil as the lumen, coating and quench fluids. The quench fluid temperature was 31.5° C.

The dimensions of the fibre were 310 micron lumen diameter and 599 micron outside diameter.

The resulting fibre had a water permeability of 52 ml/min/m at 96kPa, 241 ml/min/m at 397 kPa, and 305 ml/min/m at 598 kPa, a mean pore size of 0.322 micron and 65.7% pores above 0.16 micron.

EXAMPLE 9

5.2 kg Shell polypropylene LY6100 was dissolved in a mixture of 9.8 kg soybean oil and 4.6 kg castor oil with 0.2 kg antioxidant Ethanox 330 and extruded at a temperature of 195° C. with soybean oil as the lumen, coating and quench fluids. The quench fluid temperature was 26.2° C.

The nominal dimensions of the fibre were 320 micron lumen diameter and 650 micron outside diameter.

The resulting fibre had a bubble point of 175 kPa, a mean pore size of 0.3 micron and 87.4% pores above 0.16 micron.

EXAMPLE 10

5.2 kg Hoechst polypropylene PPR1070 was dissolved in a mixture of 9.8 kg soybean oil and 4.6 kg castor oil with 0.2 kg antioxidant Ethanox 330 and extruded at a temperature of 197° C. with soybean oil as the lumen, coating and quench fluids. The quench fluid temperature was 26.0° C.

The nominal dimensions of the fibre were 320 micron lumen diameter and 650 micron outside diameter.

The resulting fibre had a bubble point of 133 kP&, a mean pore size of 0.45 micron and 100.0% pores above 0.16 micron.

EXAMPLE 11

5.2 kg Hoechst polypropylene PPR1060F was dissolved in a mixture of 10.8 kg soybean oil and 5.0 kg castor oil and extruded at a temperature of 186° C. with soybean oil as the lumen, coating and quench fluids. The quench fluid temperature was 27.5° C.

The nominal dimensions of the fibre were 320 micron lumen diameter and 650 micron outside diameter.

The resulting fibre had a bubble point of 245 kPa, a mean pore size of 0.19 micron and 86.2% pores above 0.16 micron.

EXAMPLE 12

5.2 kg Hoechst polypropylene PPNIO70 was dissolved in 14.6 kg TERIC N2 with 0.2 kg antioxidant Ethanox 330 and extruded at a temperature of 196° C. with soybean oil as the lumen, coating and quench fluids. The quench fluid temperature was 25.4° C.

The nominal dimensions of the fibre were 320 micron lumen diameter and 650 micron outside diameter.

The resulting fibre had a bubble point of 140 kPa, a mean pore size of 0.24 micron and 89.6% pores above 0.16 micron.

EXAMPLE 13

4.8 kg Hoechst polypropylene PPN1070 was dissolved in 15.0 kg TERIC N2 with 0.2 kg antioxidant Ethanox 330 and extruded at a temperature cf 198° C. with soybean oil as the lumen, coating and quench fluids. The quench fluid temperature was 20.7° C.

The nominal dimensions of the fibre were 320 micron lumen diameter and 650 micron outside diameter.

The resulting fibre had a bubble point of 175 kpa, a mean pore size of 0.23 micron and 82.8% pores above 0.16 micron.

EXAMPLE 14

5.2 kg Hoechst polypropylene PPN1060F was dissolved in 14.6 kg TERIC N2 with 0.2 kg antioxidant Ethanox 330 and extruded at a temperature of 238° C. with soybean oil as the lumen, coating and quench fluids. The quench fluid temperature was 21.4° C.

The nominal dimensions of the fibre were 320 micron lumen diameter and 650 micron outside diameter.

The resulting fibre had a bubble point of 280 kPa, a mean pore size of 0.18 micron and 83.4% pores above 0.16 micron.

EXAMPLE 15

5.2 kg Shell polypropylene LY6100 was dissolved in 14.6 kg TERIC N2 with 0.2 kg antioxidant Ethanox 330 and extruded at a temperature of 190° C. with dioctylphthalate as the lumen, coating and quench fluids. The quench fluid temperature was 26.5° C.

The nominal dimensions of the fibre were 320 micron lumen diameter and 650 micron outside diameter.

The resulting fibre had a bubble point of 310 kPa a mean pore size of 0.24 micron and 79% pores above 0.16 micron.

EXAMPLE 16

350 g Hoechst polypropylene PPNI06OF was dissolved in a mixture of 100 g castor oil and 550 g dioctylphthalate with 1 gram antioxidant Ethanox 330 and extruded at a temperature of 190° C. with a mixture of dioctylphthalate and castor oil as the lumen and coating fluids and dioctylphthalate as the quench fluid. The quench fluid temperature was 28.9° C.

The nominal dimensions of the fibre were 320 micron lumen cuameter and 650 micron outside diameter and had a microporous structure.

EXAMPLE 17

300 g Hoechst polypropylene PPN1060F was dissolved in a mixture of 450 gram oleic acid and 250 g of the dimer acid Pripol 1017 from Unichem with 1 gram antioxidant Ethanox 330 and extruded at a temperature of 190° C. with oleic acid as the lumen and coating fluids and a mixture of ethyl cellulose and water with a viscosity of 560 centipoise as the quench fluid. The quench fluid temperature was 32° C.

The nominal dimension of the fibre were 320 micron lumen diameter and 650 micron outside diameter and had a microporous structure.

EXAMPLE 18

525 g Hoechst polypropylene PPN1060F was dissolved in 975g castor-oil with 1.5 g antioxidant Ethanox 330 and extruded at a temperature of 190° C. with diactylphthalate as the lumen, coating and quench fluids. The quench fluid temperature was gradually increased from 25° C. to 33° C.

The nominal dimensions of the fibre were 320 micron lumen diameter and 650 micron outside diameter and had a microporous structure.

EXAMPLE 19

450 g Hoechst polypropylene PPN1060F was dissolved in 1.05 kg dibutylphthalate with.1.5 g antioxidant Ethanox 330 and extruded at a temperature which gradually rose from 200° C. to 230° C. with dibutylphthalate as the lumen, coating and quench fluids. The quench fluid temperature was gradually increased from 25° C. to 33° C.

The nominal dimensions of the fibre were 320 micron lumen diameter and 650 micron outside diameter and had a microporous structure.

EXAMPLE 20

500 g Hoechst polypropylene PPN1060F was dissolved in a mixture of 350 g dioctylphthalate and 1050 g dibutylphthalate with 10 kg antioxidant Ethanox 330 and extruded at a temperature of 230° C. with dioctylphthalate as the lumen and coating fluids and 99% dibutylphthalate and 1% dioctylphthalate as quench fluid. The quench fluid temperature was 32.6° C.

The nominal dimensions of the fibre were 320 micron lumen diameter and 650 micron outside diameter.

The resulting fibre had a bubble point of 460 kpa, a mean pore size of 0.10 micron and 15% pores above 0.16 micron.

We claim:

1. A method of making a porous polymeric hollow fiber membrane comprising the steps of:
   (a) blending a mixture comprising:
      (i) a thermoplastic polyolefin and
      (ii) a cationic or non-ionic surfactant having a hydrophilic-lipophilic balance range of 4.0 to 6.0;
   (b) heating said mixture to a temperature and for a time sufficient for the polymer and surfactant to mutually dissolve to a substantially homogeneous mixture;
   (c) extruding said homogeneous mixture to a hollow fiber shape and introducing a lumen-supporting fluid into the lumen of said hollow fiber shaped, homogeneous mixture;
   (d) co-extruding a coating fluid, at a temperature substantially equal to that of said homogeneous mixture, around and contiguous to said hollow fiber shaped, homogeneous mixture;
   (e) co-extruding a cooling fluid around and contiguous to said coating fluid, to cool said homogeneous mixture to a temperature so that non-equilibrium liquid-liquid phase separation of said mixture takes place to form a bi-continuous matrix of the polymer and surfactant so that the polymer and surfactant form two intermingled separate phases, of large interfacial area;
   (f) further cooling said two intermingled separate phases to a temperature at which at least said polymer forms a solid phase in said hollow fiber shape configured as one phase of said bi-continuous matrix; and
   (g) removing the surfactant phase from said polyolefin hollow fiber to produce said porous hollow fiber membrane.

2. A method according to claim 1 wherein the diameter of the fiber is reduced after formation of the hollow fiber shape, the ratio of the final diameter of the fiber to that of the initial diameter being in the range of from 0.25 to 0.10.

3. A method according to claim 1 wherein the fiber forming mixture is extruded at a different linear speed from the cooling fluid.

4. A method according to claim 3 wherein the fiber forming mixture travels at a speed 3 to 4 times faster than the average speed of the cooling fluid.

5. A method according to claim 1 wherein the lumen-supporting fluid is nitrogen gas or a saturated vapour.

6. A method according to claim 1 wherein the coating fluid is a member selected from the group consisting of soybean oil, paraffin oil, peanut oil, teel oil, boleko oil, oil of mustard, olive oil, seneca oil, coconut oil, coffee oil, rapeseed oil, corn oil, cottonseed oil, glycerol, glyceryl trioleate, trimyristin, jojoba oil, macassar oil, neem oil, castor oil, orris root oil and safflower oil and oleic, palmitic, stearic arachidic, arachidonic, behenic, lignoceric, linoleic, linolenic, elaidic, vaccenic acids and their glycerides, and mixed with their sodium, potassium and calcium salts.

7. A method according to claim 1 wherein the cooling fluid is the same as the coating fluid.

8. A method according to claim 7 wherein the lumen-supporting fluid is the same as the coating fluid and the cooling fluid.

9. A method according to claim 1 wherein the polymer is a member selected from the group consisting of polypropylene, and polybutylene.

10. A method according to claim 1 wherein the surfactant is a member selected from the group consisting of nonylphenoxyethoxyethanol, an amine ethoxylate, a polyoxyethylene(2)oleyl alcohol, ethyloxylated derivatives of cetyl-oleyl alcohol, condensates of ethylene oxide with tall oil, self-emulsifying derivatives from high molecular weight fatty acids, sorbitan monooleate, sorbitan monostearate, POE cetyl-oleyl alcohol, ATMER 685 nonionic surfactant, POE (2) cetyl alcohol, POE (2) stearyl alcohol, POE fatty alcohols and POE (2) synthetic primary $C_{13}/C_{15}$ alcohol.

11. A method according to claim 1 wherein the fiber forming mixture includes an anti-oxidant selected from the group consisting of (1,3,5,-trimethyl-2,4,6-tris-3,5-di-tert-butyl-4-hydroxybenzyl)benezene and a dissolvable hindered phenol.

12. A method according to claim 1 wherein the polymer is polypropylene and the surfactant is nonylphenoxyethoxyethanol and wherein the concentration of the polymer in the mixture is from 15% to 50% weight by weight.

* * * * *